United States Patent [19]

Rink et al.

[11] Patent Number: 5,472,087
[45] Date of Patent: Dec. 5, 1995

[54] FASTENER FEED SYSTEM

[75] Inventors: Philip A. Rink, Everett; Peter B. Zieve, Seattle, both of Wash.

[73] Assignee: Electroimpact, Inc., Mukilteo, Wash.

[21] Appl. No.: 294,381

[22] Filed: Aug. 23, 1994

Related U.S. Application Data

[62] Division of Ser. No. 27,834, Mar. 8, 1993, Pat. No. 5,339,598, which is a division of Ser. No. 693,628, Apr. 30, 1991, Pat. No. 5,193,717.

[51] Int. Cl.$^6$ .................................................. B65D 85/30
[52] U.S. Cl. ........................................... 206/341; 206/443
[58] Field of Search ..................................... 206/338, 340, 206/341, 443

[56] References Cited

U.S. PATENT DOCUMENTS

| | | | |
|---|---|---|---|
| 3,672,738 | 6/1972 | Buttriss | 206/338 X |
| 4,199,093 | 4/1980 | Combette et al. | 206/338 X |
| 4,706,812 | 11/1987 | Spinelli et al. | 206/338 X |

Primary Examiner—Jacob K. Ackun
Attorney, Agent, or Firm—Jensen & Puntigam

[57] ABSTRACT

A rivet feed system which includes a base feeder assembly (28), having a rivet passageway (30) extending lengthwise therethrough. The base feeder assembly (28) includes cutout regions to receive rivet injectors (24) which are moved in operation between a first position and a second position. In the first position, an opening (80) in the injectors (24) forms a part of the passageway (30) through the base feeder assembly (28), while in the second position, the opening (80) is positioned directly beneath a vertically oriented rivet cartridge (22) to receive a rivet therefrom. The passageway (30) is connected to a source of pressurized air (32) which moves rivets therealong to a rivet machine or the like. The plurality of cartridges (22) positioned along the base feeder assembly contain rivets of various selected sizes. The rivet cartridges (22) are filled off line by means of a vibrating bowl feeder (117) and a rivet insertion assembly which includes a rivet pump (120) which automatically and repetitively moves rivets which have been inserted thereinto from the bowl feeder (117) into the rivet cartridge (22).

4 Claims, 7 Drawing Sheets

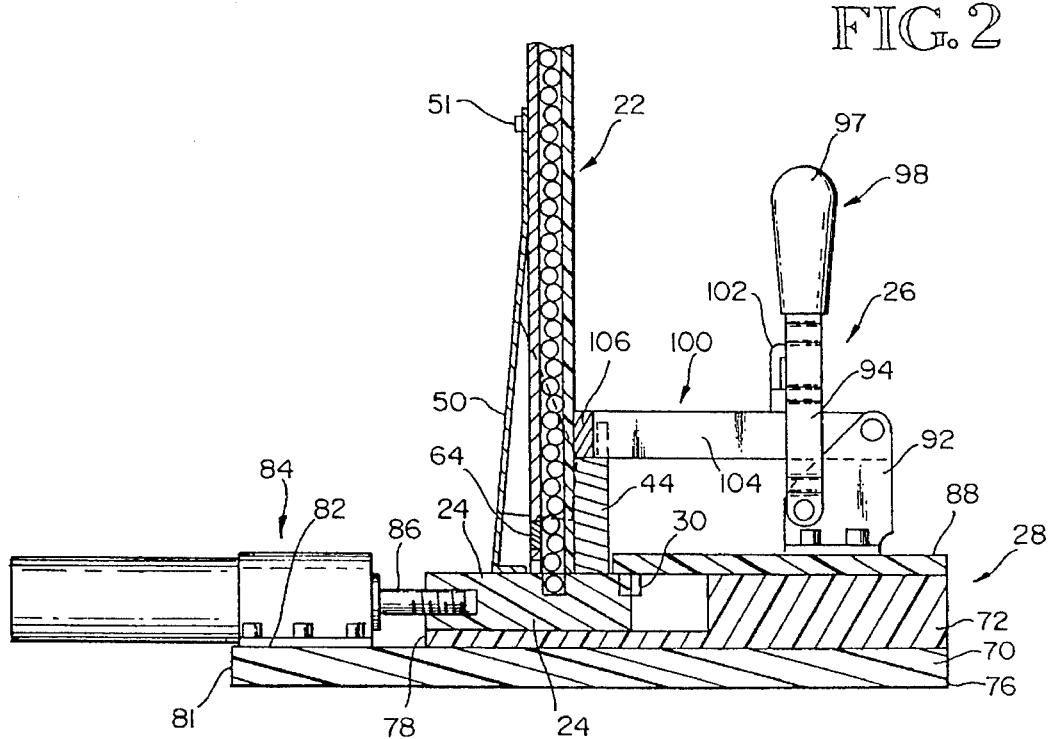
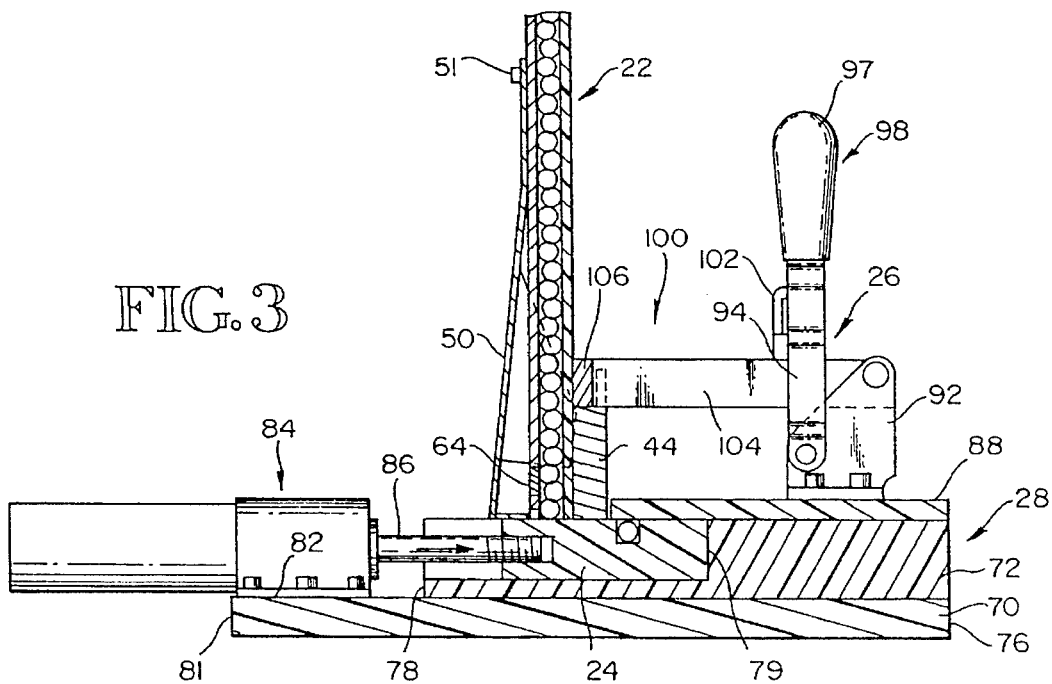

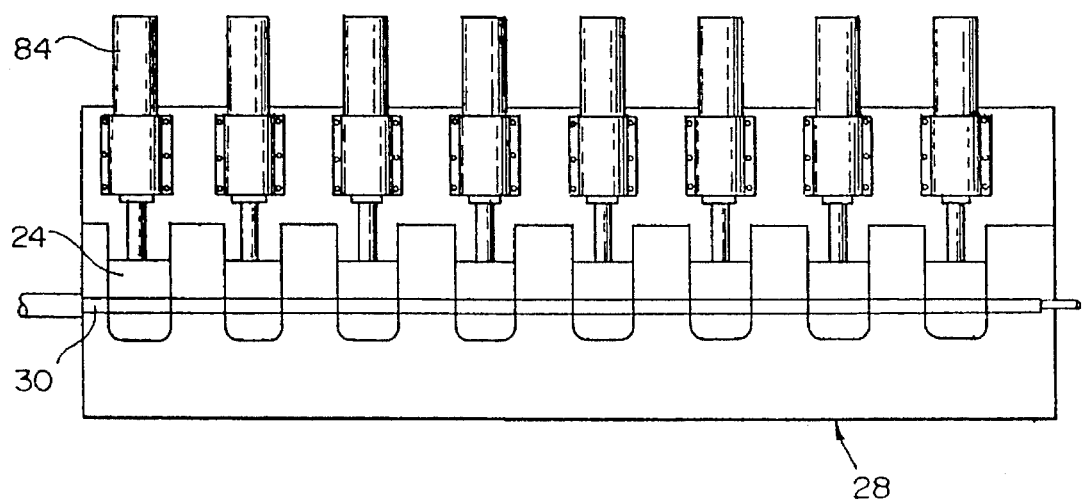
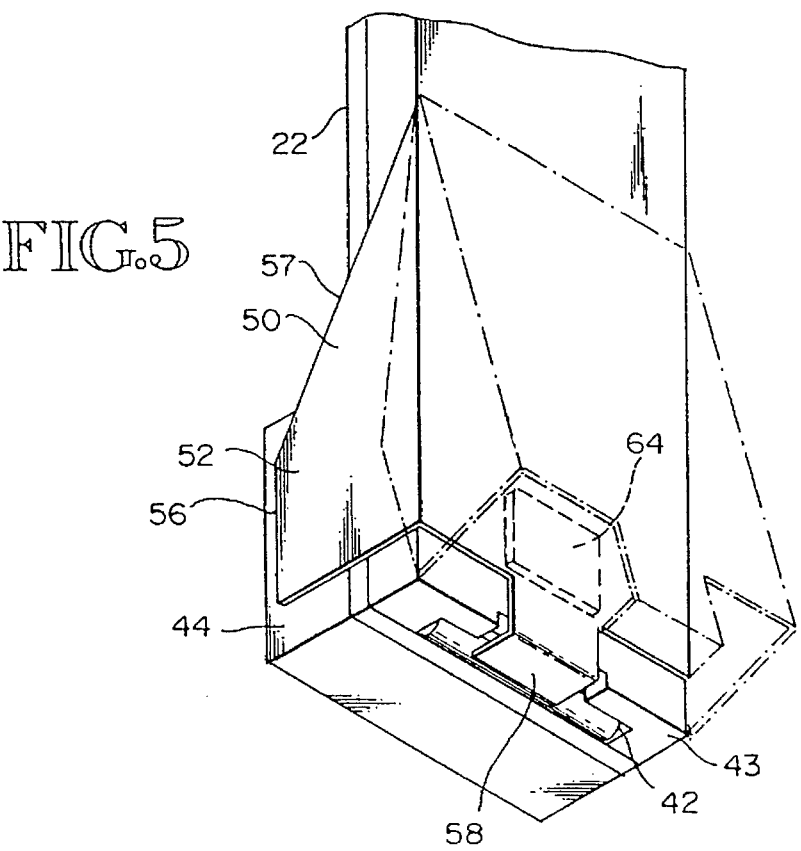

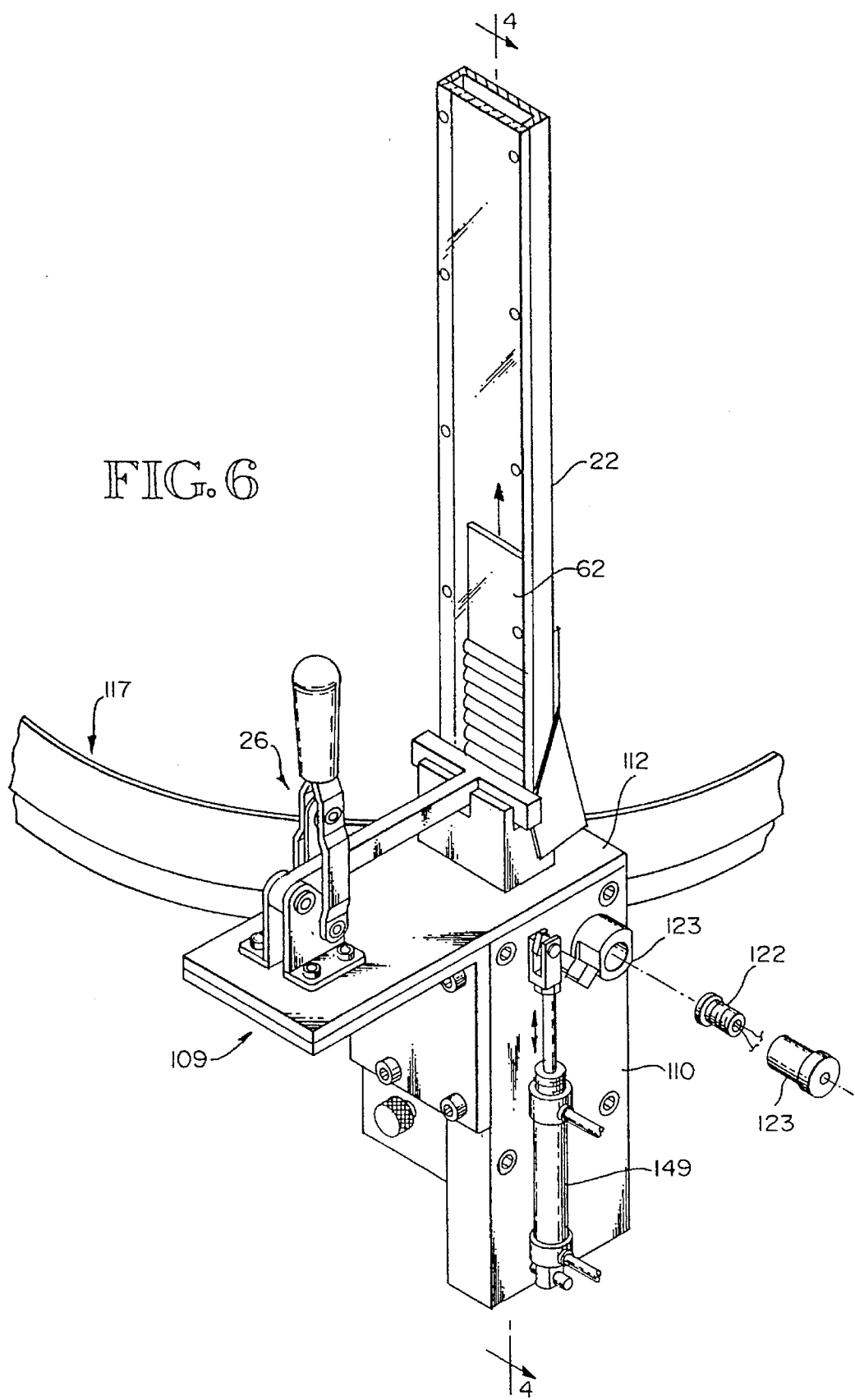

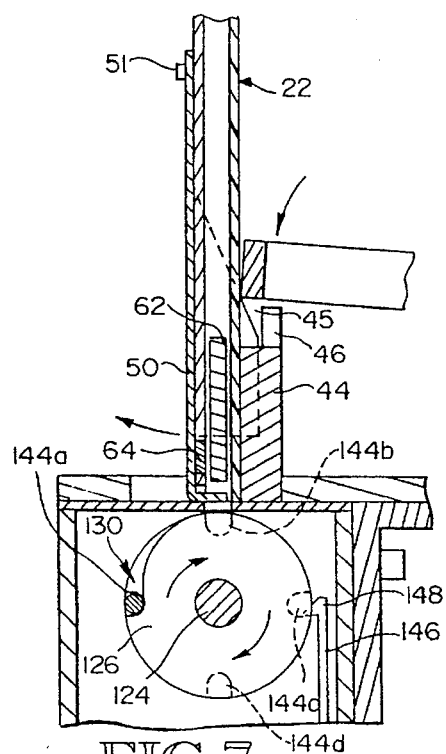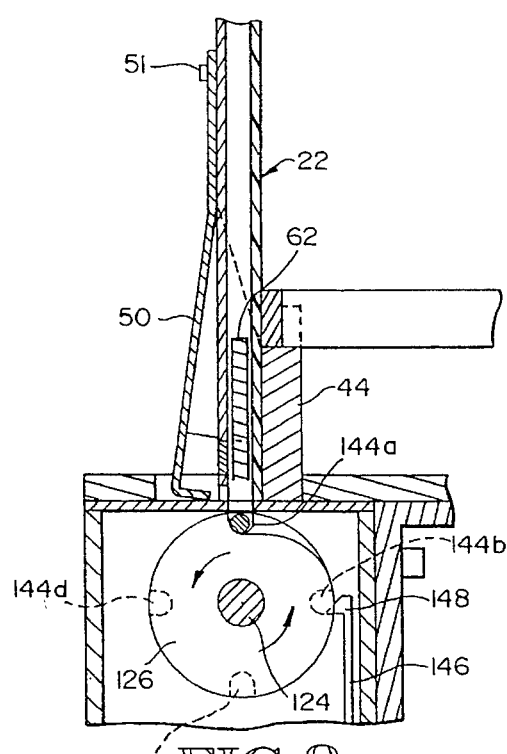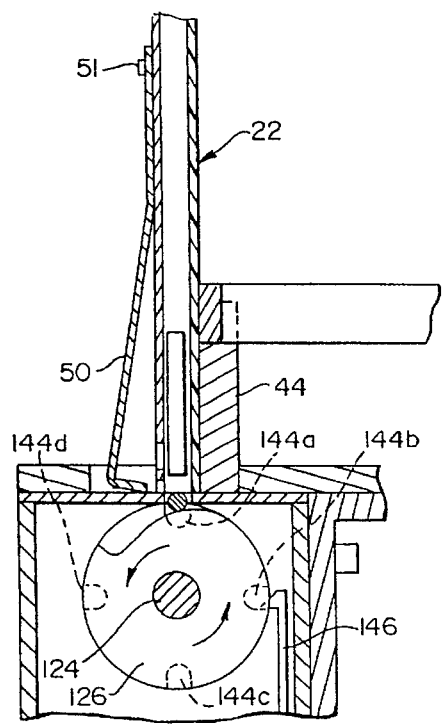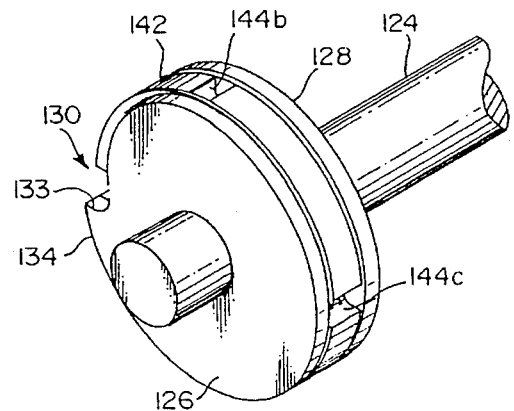

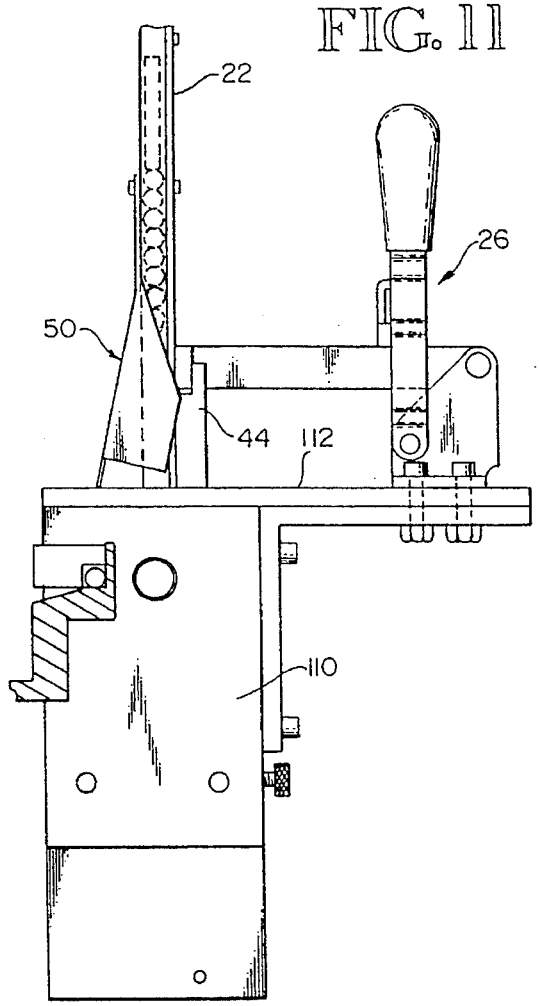
FIG. 11
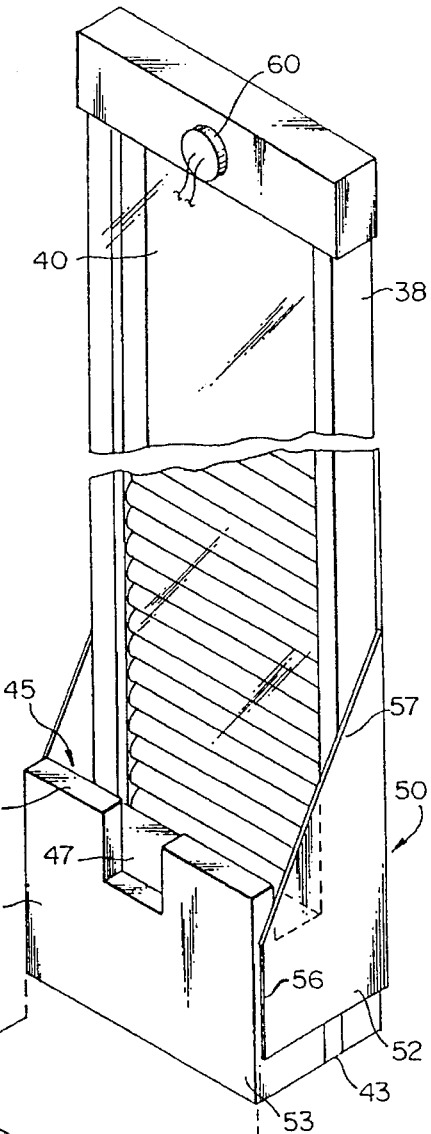
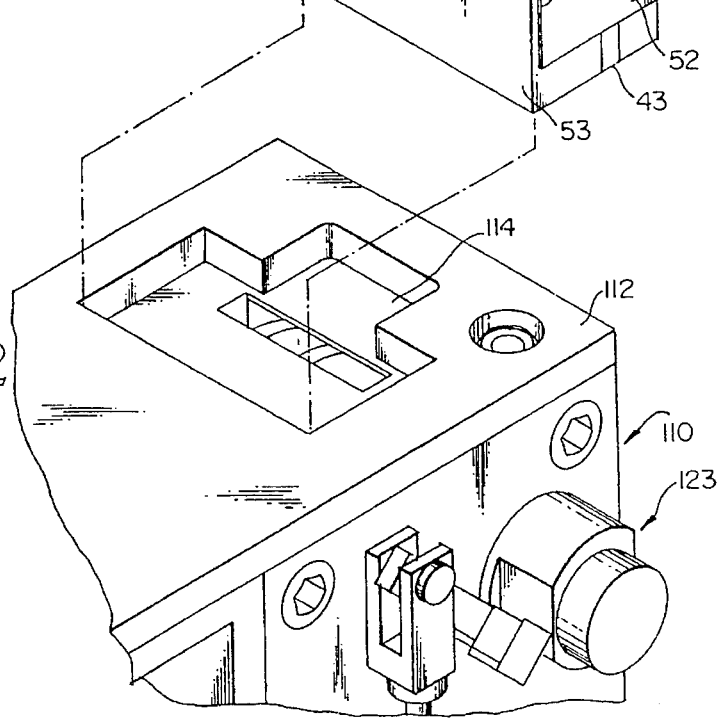
FIG. 12

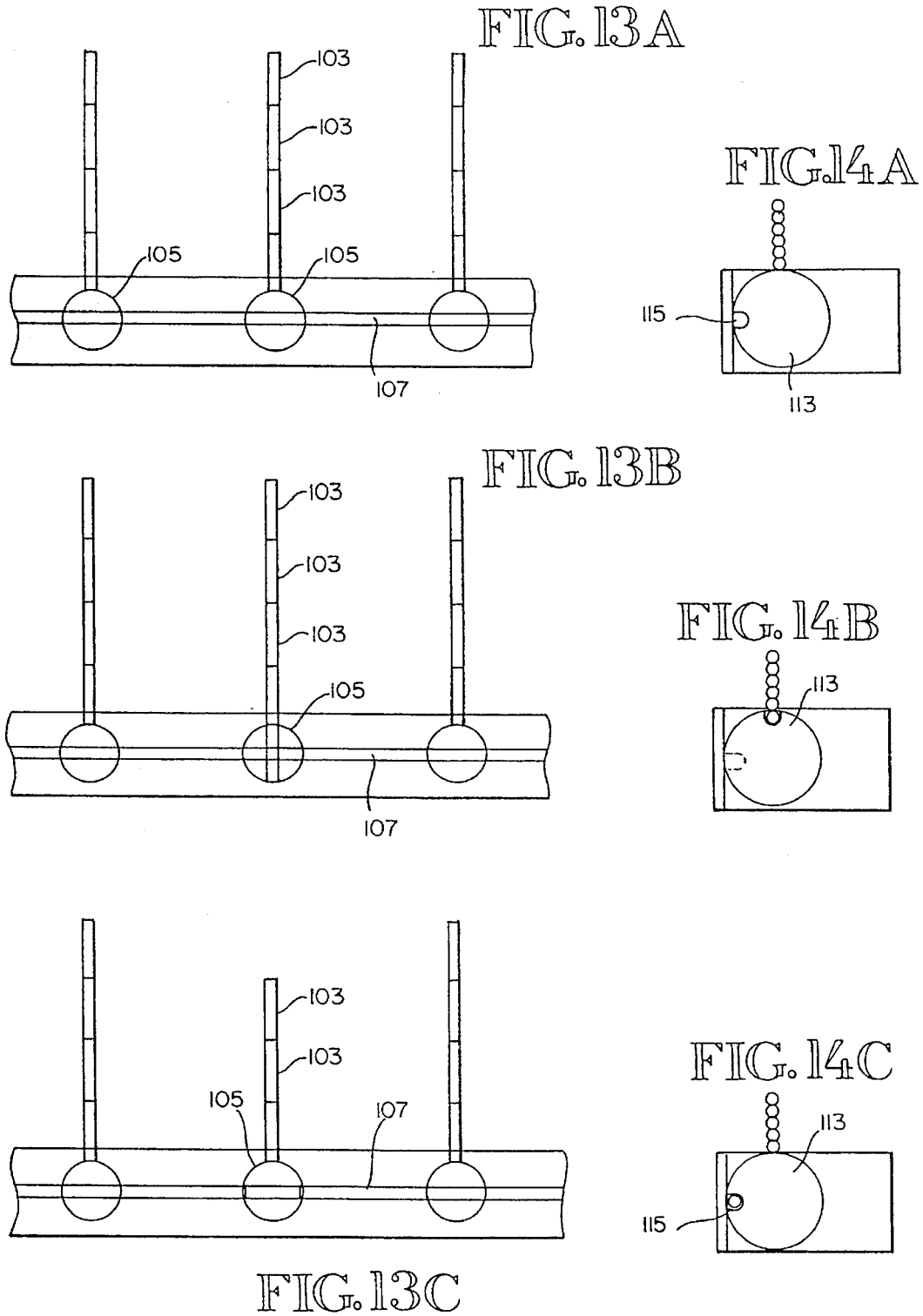

FASTENER FEED SYSTEM

This is a divisional of application Ser. No. 027,834, filed on Mar. 8, 1993, now U.S. Pat. No. 5,339,598, which in turn was a divisional of application Ser. No. 693,628, filed on Apr. 30, 1991, now U.S. Pat. No. 5,193,717.

TECHNICAL FIELD

This invention relates to an apparatus for supplying fasteners, such as rivets, to a tool, such as an automatic riveting machine, for use in assembly operations.

BACKGROUND OF THE INVENTION

All tools which use fasteners, such as rivets or the like, for various fastening operations, such as in the manufacture of aircraft, require a fastener feed system. Depending upon the tool, such a fastener feed system can be manual or it can involve various combinations and arrangements of mechanical and/or electro-mechanical assemblies which in one form or another automatically feed fasteners to the tool. In one specific example involving rivets, an apparatus known as a vibratory bowl is used to supply rivets to a high production riveting machine. With the vibratory bowl, a large number of fasteners is emptied into the bowl, with the fasteners being randomly distributed. The combined effect of the configuration of the vibratory bowl and the vibrating action results in the rivets being positioned end-to-end in single file at the outlet of the bowl. From the bowl, rivets are fed into an escapement line which in turn connects to a main rivet feed line to which a source of pressurized air is connected. The air moves the rivet at high speed in the main feed line, typically one at a time, to the riveting machine.

However, vibratory bowls have a number of disadvantages. One significant disadvantage is their size and weight. Since each size rivet requires a separate vibratory bowl, and since as many as thirty (30) different rivet configurations are necessary in a large scale assembly operation, thirty (30) bowls would be required for such a rivet feeding system. This requires a considerable amount of space relatively close to the riveting machine.

In addition, while vibratory bowls are generally reliable, in operation, they do from time to time have jamming problems, particularly where the rivets move from the bowl into the escapement line. In a complete assembly system using high speed automatic riveting equipment, all of the individual subsystems must be reliable for the overall system to perform well. While the use of vibratory bowls has had a negative effect on overall system reliability, there has been few if any viable alternatives to date with the vibratory bowl arrangement.

Hence, there is a significant need for a more reliable and more streamlined system for automatically feeding fasteners to a fastening tool such as a riveting machine.

DISCLOSURE OF THE INVENTION

Accordingly, the present invention includes a fastener feed system for use with a fastener installation tool, comprising a base feeder assembly which includes a passageway therein for receiving fasteners and moving those fasteners to a fastener installation tool; means for moving the fasteners along the passageway by fluid pressure, such as air; means for storing the fasteners; and means for receiving a fastener from the fastener storage means and for injecting the fasteners into the fastener passageway. The receiving and injecting means is movable between first and second positions. The receiving and injecting means includes an opening which forms part of the fastener passageway when it is in its first position and into which a fastener is received from the fastener storage means when it is in its second position.

Also, the present invention includes a system for loading fasteners in a cartridge, comprising means for supporting a cartridge which has an internal opening for storing fasteners, the cartridge being adapted to receive fasteners at a bottom end thereof, through an opening therein; fastener insertion means which includes means receiving fasteners means for moving a fastener into position beneath the bottom end of the cartridge and means for moving the fastener up into the cartridge; and means for feeding fasteners to the fastener insertion means in a selected orientation.

Still further, the present invention comprises a cartridge for storing fasteners from which fasteners are obtained and fed to a fastener installation tool, comprising an elongated cartridge for storing fasteners from which fasteners are obtained and fed to a fastener installation tool, comprising an elongated cartridge body, having an internal opening which extends the length thereof, the opening having dimensions slightly greater than the dimensions of the fastener; an opening at the lower end of the cartridge body for exit and entry of fasteners; and a latch movable between a first position and a second position. In the first position the latch includes a portion thereof which extends over the opening at the bottom of the cartridge, preventing fasteners from moving through the opening and in the second position, the portion of the latch is moved relatively away from the opening, permitting fasteners to move therethrough.

BRIEF DESCRIPTION OF THE DRAWINGS

FIG. 2 is a cross-sectional view of the rivet feed assembly of FIG. 1, with the injection portion thereof shown in a second position.

FIG. 3 is a cross-sectional view of the rivet feed assembly of FIG. 1, with the injector portion thereof shown in a first position.

FIG. 4 is a cross-sectional view showing a portion of the rivet feed assembly of FIG. 1.

FIG. 5 is an isometric view showing a portion of a rivet cartridge.

FIG. 6 is an isometric view showing the rivet cartridge filling system of the present invention.

FIGS. 7–9 are cross-sectional views of the rivet cartridge filling system of FIG. 6, showing a portion of the system in various operating position.

FIG. 10 is an isometric view of a portion of the rivet cartridge filling system of FIG. 6.

FIG. 11 is a side elevational view of the rivet cartridge filling system of FIG. 6.

FIG. 12 is an isometric, partially exploded view of the rivet cartridge filling system of FIG. 6.

FIGS. 13a–13c are simplified elevational view of an alternative embodiment of a portion of the rivet feed system of FIG. 1.

FIGS. 14a–14c are simplified elevational view of another embodiment of a portion of the rivet feed system of FIG. 1.

BEST MODE FOR CARRYING OUT THE INVENTION

Figure 1:
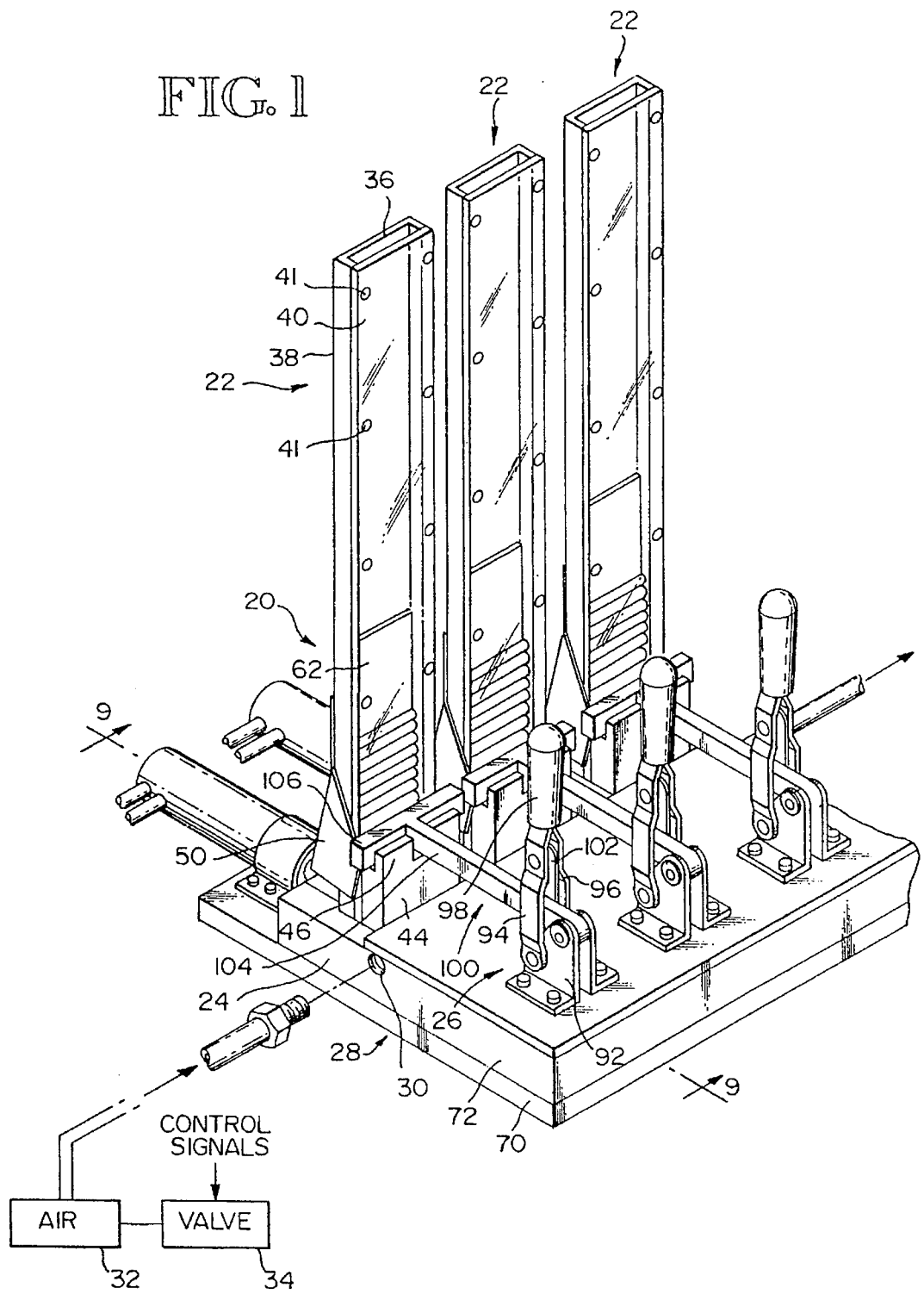
FIG. 1 is an isometric view of the rivet feed assembly of the present invention.

FIG. 1 shows an isometric view of a portion of the fastener feed system of the present invention, referred to generally at 20. While the following description of the present invention is specific to rivet fasteners, for ease of explanation and illustration, it should be understood that the invention can be used for other similar fasteners.

Basically, the rivet feed system 20 includes a plurality of vertically mounted rivet cartridges 22—22, each cartridge containing a large number of rivets of a particular size arranged in a single column. The actual number of cartridges 22—22 used in a particular rivet feed system will depend upon the number of different size rivets required for the particular operation being performed by the riveting apparatus. For instance, if the riveting operation involves the assembly of an aircraft wing, a substantial number of cartridges will be necessary, while other assembly operations may require a smaller number of cartridges.

Each cartridge 22 in the embodiment shown is mounted vertically on its own horizontal injector mechanism 24 by means of a mounting latch system 26. The cartridge 22 could be mounted in different orientations. The injectors 24—24 associated with successive cartridges 22—22 form part of a base feeder assembly shown generally at 28. Extending lengthwise through the entire base feeder assembly is a rivet passageway 30. Rivets are driven along the rivet passageway 30 by pneumatic means shown representationally by a source of pressurized air 32, actuated by a solenoid valve 34 which in turn is controlled by the system control circuitry (not shown). It should be understood, however, that actuation means other than pressurized air may be conveniently used.

As explained in more detail below, the rivet passageway 30 extends through each of the injectors 24 when the injectors are in a first operating position, such that the complete passageway 30 is formed by a fluid tight successive arrangement of injectors 24 in their respective first operating positions and fixed intermediate portions of another part of the base feeder assembly. In operation, the injectors 24 shuttle laterally of the base feeder assembly 28 between their first position and a second position where the opening in the injector which forms part of passageway 30 when the injector is in its first position, is directly beneath its associated rivet cartridge 22. When the injector is in its second position, the lowermost rivet in the cartridge drops into the opening in the injector. The injector is then moved back to its first position, the source of pressurized air is actuated and the rivet is then moved under high air pressure along the passage way to the riveting machine.

FIGS. 1–3, 5 & 12 show a rivet cartridge in more detail. The cartridge 22 is elongated with a central opening or slot 36 which receives and retains a stack of horizontally oriented cylindrical rivets. The rivets abut along their cylindrical surfaces in the embodiment shown, but they could also be stacked end to end. The opening 36 is slightly larger than the dimensions of the rivet, in order to provide the rivets a minimum amount of freedom of movement, so that they might move downwardly relatively freely without becoming misarranged. In the embodiment shown there is approximately a total of $^{15}/_{1000}$ths clearance around the rivets. In one embodiment, the cartridge 22 is formed by a shallow u-shaped back element 38 and a flat front element 40 which is attached by means of screws 41—41 or the like to the free edges of the back element 38. In one embodiment, the back element is metal, such as aluminum, and the front element is clear plexiglass, so that the number of rivets in the cartridge may be readily ascertained by visual inspection. The cartridge 22 has an opening 42 at the bottom thereof to facilitate entry and exit of rivets into and from the cartridge.

Near the lower end 43 of the cartridge 22, and extending forwardly from the front element 40 is a mounting element 44. The mounting element 44 in the embodiment shown externals for the width of the cartridge, is approximately two inches high and extends forwardly of the cartridge approximately ½ inch. In the upper part of the mounting element 44 is a cutout region 45 (FIG. 12) at the rear of the mounting element, the cutout region extending for the entire width of the mounting element, leaving an approximately 0.2 inch thick lip 46 at the front of the mounting element and a space of 0.3 inch between the lip 46 and the front element 40 of the cartridge. The lip 46 includes a centrally located notch 47. The notch 47 is approximately 0.5 inch deep, 0.3 inch wide and extends completely through lip 46. The cutout region, the lip and the notch are arranged to facilitate the insertion and removal of a mounting latch, as explained in more detail below.

The cartridge 22 also includes a rivet catch shown generally at 50. The rivet catch 50 is a relatively thin but stiff metal member which is mounted to the rear surface of the back element 38, approximately 5 inches up from the lower end thereof, by means of screws 51 or the like. The catch 50 extends downwardly therefrom until very near the lower end of the cartridge. Two side ear portions 52—52 of the rivet catch extend around the cartridge 22, adjacent the respective sides thereof, to near the front surface 53 of mounting element 44. The side ears 52 include a front edge portion 56 which is generally parallel to the front surface of the mounting element 44, when the catch is in its forward (rest) position, and an angled edge portion 57 which angles upwardly from the front edge portion 56 rearwardly to the remainder of the catch 50. Catch 50 also includes a bottom ear 58 (FIG. 5) which extends around the bottom of cartridge 22 and across the rivet opening 42.

The entire catch 50 may be moved a small distance rearwardly of the cartridge about its mounting screws. When the catch is in its forward position, the bottom ear 58 extends across a substantial portion of the rivet opening 42, thereby preventing rivets from entering or exiting the cartridge 22. However, when the catch 50 is moved rearwardly, such as when the cartridge is inserted into the base feeder assembly and the mounting latch 26 is operated, bottom ear 58 moves sufficiently away from the rivet opening 42 so as to permit entry and exit of rivets. The cartridge 22 is both filled and emptied through opening 42.

A steel follower plate 62 is positioned in the opening 36 in the cartridge, on top of the rivet stack therein. The steel follower plate 62 is free to move with the downward movement of the rivets within the opening as the rivets exit from the cartridge and prevents the rivets in the stack from vibrating to a skewed orientation during operation of the rivet feed system. A magnet 64 is positioned near the lower end of the cartridge 22, accessible to the internal opening 36. The magnet 64 captures the follower plate 62 when all the rivets have exited the cartridge, thereby preventing follower plate 62 from falling through the rivet opening 42. Alternatively, the follower plate could be a piece of material, such as lead, with a magnet in it. The magnet 64 has no effect on aluminum rivets.

The base feeder assembly 28 is shown in detail in FIGS. 2–4. The base feeder assembly 28 includes a plurality of injectors 24, each uniquely associated with a particular cartridge 22, as explained above, arranged in sequence along a feeder line, as shown in FIG. 4. Referring to FIGS. 1–3, the feeder base assembly also includes a lower base plate 70 which extends the entire length of assembly 28 and which in one embodiment is 60 inches wide by 1¾ inches high. Positioned on top of the lower base plate 70 is an intermediate base element 72 which also extends the length of the base feeder assembly 28. The forward vertical edge 74 of intermediate base element 72 is an extension (vertically) of the forward vertical edge 76 of lower base plate 70. Intermediate base element 72 overlies a substantial portion of lower base plate 70, extending rearwardly from their respective front edges 76 and 74. At successive intervals along the length of the intermediate base element 72 are cutout regions to accommodate successive injectors. Each cutout region extends from the rear edge 78 of the intermediate base element 72, and extends forwardly approximately 7 inches and is 2 inches wide. The intermediate base element is approximately 0.25 inches thick over the area of the respective cutout regions. Into the cutout regions are positioned the rectangular injector elements 24—24. Each injector element 24 in the embodiment shown is approximately 4½ inches long, 2 inches wide and ¼ inch high. The side edges of the injector element mate with the sides of the cutout region in the intermediate base element 72. In the embodiment shown, there is approximately 5/1000ths between each side of the injector and the intermediate base element, in order to maintain a fluid-tight relationship. In the top surface of the injector is a longitudinal opening 80. The opening 80 in each injector forms a portion of the overall rivet passageway 30 which extends the length of the base feeder assembly.

Positioned on the upper surface 82 of lower base plate 70 toward the rear edge 81 thereof are successive air cylinder elements 84, the respective extending arms 86 of each of which are connected to rear of successive injectors 24. In operation, the air cylinder 84 moves the injector 24 between two positions. In a first or rest position, the injector 24 is in its most forward position, abutting the intermediate vertical edge 79 of the intermediate base element 72 as shown in FIG. 3. When the injector 24 is moved to its second position by the air cylinder, opening 80 in the injector is positioned directly beneath the opening 42 in the rivet cartridge, permitting a rivet from the cartridge to fall into the opening 80, as shown in FIG. 2. The injector is then moved back to its first or rest position. Pressurized air then is used to move the rivet along the complete passageway 30 formed by openings 80 in successive injectors and alternating openings in the intermediate base element 72 which are in registry with the openings 80 when the injectors are in their first positions. Overlaying the top of the intermediate base element 72 and a portion of the successive cutout regions and hence openings 80—80 when the injectors are in their first position, is an upper base plate 88. The upper base plate 88 extends the length of the base feeder assembly.

Mounted on top of the upper base plate 88 and associated with each successive cartridge 22 are a plurality of hold down clamps 26—26. Each hold down clamp 26 includes aim upstanding base member 92 which is mounted directly to upper base plate 88. The base member comprises two spaced apart L shaped flanges in the embodiment shown. Pivotally secured to the base member 92 are two spaced apart arms 94 and 96 which extend upwardly from the base member 92 and then come together in combination with a cap 97 to form a handle 98. Extending from each base member 92, in particular from between the two L shaped flanges thereof toward its associated cartridge is a t-shaped member 100. Pivotally connected between the two arms 94, 96 and the t-shaped member 100 is a short linking member 102. The two arms 94, 96, the t-shaped member 100 and the linking member 102 are arranged so that as handle 98 is moved away from the cartridge, the t-shaped member 100 rotates away from the cartridge to a vertical position, while when the handle is rotated toward the cartridge, to a vertical position, the t-shaped member 100 moves to a horizontal position in which the elongated leg portion 104 of the t-shaped member fits into the notch 47 of the mounting element and the top cross bar portion 106 fits snugly just behind the lip 46 of the mounting element, thereby holding the cartridge firmly in place on the base feeder assembly.

In operation, cartridges with rivets are positioned along the base feed assembly as needed, with each cartridge having a different size rivet therein. All of the injectors are positioned in their first position, thereby defining a continuous fluid tight passageway along the base feeder assembly. Connected to the base feeder assembly is a source of pressurized fluid, such as air. Individual rivets are then moved successively into the passageway by operation of the injectors, moving, by means of the air cylinders, from their first position into their second position to receive a rivet and then back into their first position, with the rivet now in the rivet passageway. The solenoid valve connecting the source of pressurized air to the passageway is activated, and the rivet is moved through the passageway to the tool, for use in assembling a selected product such as an aircraft wing or the like.

FIGS. 13*a*–13*c* show another embodiment for the rivet injectors. In this embodiment, the rivets 103 are stacked end-to-end in the cartridge. The injectors 105 rotate 90° from a first position, shown in FIG. 13*a*, to a second position, shown in FIG. 13*b*, to receive a rivet. The injector then rotates back to its first position, as shown in FIG. 13*c*; the rivet is now in the passageway 107, along which it is moved to the tool.

FIGS. 14*a*–14*c* show another embodiment involving a rotating injector 113. In a first position, as shown in FIG. 14*a*, a longitudinal opening 115 in the injector 113 forms part of the extended rivet passageway. The injector is rotated 90° to a second position, where it receives a rivet from the cartridge, as shown in FIG. 14*b*. The injector is then moved back into its first position, as shown in FIG. 14*c*, with the rivet now in the passageway.

FIGS. 6 through 12 show another aspect of the present invention, in particular a system for filling the cartridges with rivets. The cartridge filler system shown generally at 109 includes a rivet pump housing 110, at the top of which is a mounting plate 112 having a cutout portion therein 114 which mates with the configuration of the lower end of a cartridge 22. On plate 112 is mounted a hold down clamp 26 which is identical in structure and operation to the hold down clamps 26 used with the base feeder assembly. The purpose of hold down clamp 26 is to hold the cartridge 22 in a vertical orientation for filling, although the cartridge could be filled in the other orientations. The rivet filling system includes a conventional bowl feeder partially shown at 117 in FIG. 6. The rivets from bowl feeder 117 are lined up end-to-end and fed into a rivet pump assembly contained in housing 110. The rivet pump assembly is shown in FIGS. 7 through 10. The rivets are successively correctly initially positioned in the rivet pump assembly 120 by a proximity sensor 122, which is positioned in one side of the housing 110. The proximity sensor 122 is mounted in an assembly 123 which permits adjustment of the position of sensor 122 to accommodate rivets of various lengths.

The rivet pump assembly 120 includes a double action rod-like cylinder 124 which extends out the side of the case 112. Mounted on the cylinder 124 are two identically configured cam elements 126 and 128. The cam elements 126 and 128 are approximately ⅛ inch thick, generally circular in outline, approximately 2 inches in diameter and are fixably connected to the cylinder approximately ⅜ inch apart. The two cam elements 126 and 128 include identical scooped out portions 130. Scooped out portion 130 is defined by a surface which includes a leading edge 133 which extends from the peripheral edge 134 of the cam element inwardly thereof approximately ¼ inch, where it begins to curve outwardly into a flat portion approximately at right angles to the leading edge 133, and then curves gently to blend into the peripheral edge 134. The scooped out portion 133 covers a radial distance of 90°.

Positioned between the first and second cam elements 126 and 128 is a third cam element 142 which rotates freely around cylinder 124 between the cam elements 126 and 128. Cam element 142 is approximately ¼ inch thick and has the same diameter as first and second cam elements 126 and 128. Positioned at 90° intervals around the peripheral edge of cam element 142 are four notch-like portions 144a–144d, which are configured to receive a rivet. In operation, referring to FIGS. 7 through 9, one of the notches 144a in cam element 142 is lined up with the forward part of the respective scooped out portions 130 of cam elements 126 and 128, which are in registry as indicated above. A rivet is moved into the notch 144a, from the bowl feeder, so that it extends laterally across the three cam elements, below the peripheral edges of the cam elements. This is the first step in the rivet filling process and is illustrated in FIG. 7. The proximity sensor determines the correct initial axial position for the rivet.

The cylinder 124 is then rotated approximately 95°, carrying with it the first and second cam elements 126 and 128, as well as cam element 142 and the rivet, since the rivet in effect joins all three cam elements together for rotation when the cylinder is rotated in the direction shown in FIG. 7. After slightly more than 90° of rotation, the notch 144b, which is 90° removed from the notch containing the rivet, comes into mating contact with a pivoting pawl 146. The top end 148 of pawl 146 enters notch 144b, as shown in FIG. 8. At this point, notch 144a and the rivet therein are directly beneath the rivet opening in the lower end of the cartridge; the rotation of cylinder 124 is stopped. The cylinder 124 is then rotated in the opposite direction, as shown in FIGS. 8 and 9, taking with it the first and second cam elements 126 and 128 back to their original rotational position. However, the third cam 142 remains in place, because of the restraining action of the pawl 146. As the two cam elements 126 and 128 rotate, the rivet rides on the surface of the scooped out portions thereof, and as the surface comes closer to the peripheral edge of the first and second cam elements, the rivet is forced upwardly into the cartridge, as shown partially in FIG. 9. When the cylinder 124 moves to its original position, it is now lined up with notch 144d in the third cam element, and the apparatus is set to receive the next rivet from the vibrating bowl. The rotation of the cylinder 124 in both rotational directions is provided by an air cylinder 149, positioned on the side of housing 110.

This process continues until the cartridge is completely filled. When the rivet stack nears the top of the cartridge, a proximity switch 60, which is located in a housing which supports the upper end of the cartridge during rivet filling operations, senses the approaching topmost rivet (or follower plate 62) and terminates the action of the rivet pump.

The filled cartridge is removed from the mounting plate 112 and is stored for future use with the base feeder assembly, as described above.

In summary, rivets are initially placed in a vibratory bowl feeder, and then moved one by one into the rivet pump, which fills a given cartridge. The filling of the cartridges is done "off line" from the rivet feed system. The filled cartridges are stored, ready to be used when needed in the rivet feed system. The rivet feed system includes a base feeder assembly which includes injectors which move rivets from the rivet cartridges which are now mounted on the base feeder assembly into a rivet passageway and then to the riveting tool. Although a preferred embodiment of the invention has been disclosed herein for purposes of illustration, it should be understood that various changes, modifications, and substitutions may be incorporated in such embodiment without departing from the spirit of the invention as defined by the claims which follow:

What is claimed is:

1. A cartridge for storing fasteners from which fasteners are obtained and fed to a fastener installation tool, comprising:

an elongated cartridge body, having an internal opening which extends along the length thereof, the opening having dimensions slightly greater than the dimensions of the fastener;

an opening at the lower end of the cartridge body for exit and entry of fasteners; and a latch connected to the cartridge body and having a bias action tending to move the latch to a first position relative to the cartridge body, the latch being movable between the first position and a second position, wherein in the first position, the latch includes a portion thereof which extends over the opening at the bottom of the cartridge, preventing fasteners from moving through the opening and wherein, when the latch is forced away from the first position against the bias to the second position, the portion of the latch is moved relatively away from the opening, permitting fasteners to move therethrough.

2. A cartridge of claim 1, including a mounting element located near the bottom of the cartridge, adapted to cooperate with a clamp for the cartridge mounted such that when the clamp is holding the cartridge in place, a portion of the clamp moves against the latch, forcing the latch from its first position to its second position.

3. A cartridge of claim 1, including means for maintaining the relative orientation of the fasteners during entry and exit of fasteners from the cartridge.

4. A cartridge of claim 1, including a magnet positioned at the lower end of the cartridge adjacent the internal opening and a follower element which rides on top of the uppermost fastener in the cartridge, moving downwardly as the fasteners move from the cartridge means, maintaining time fasteners in proper relationship, wherein the magnet captures the follower element when the follower element comes into proximity with the magnet, preventing the follower element from moving through the opening at the lower end of the cartridge.

\* \* \* \* \*